United States Patent Office 2,713,587
Patented July 19, 1955

2,713,587
11,17-DIHYDROXY-4-PREGNENE-3,20-DIONE

Clarence G. Bergstrom, Chicago, Ill., assignor to G. D. Searle & Co., Chicago, Ill., a corporation of Illinois No Drawing. Application March 8, 1952,
Serial No. 275,663

1 Claim. (Cl. 260—397.45)

The present invention relates to some new polycyclic polyhydroxypolyketones and, more particularly, to 11,17-dihydroxy-4-pregnene-3,20-dione and its 21- halogenated derivatives. The compounds which constitute this invention can be represented by the following structural formula

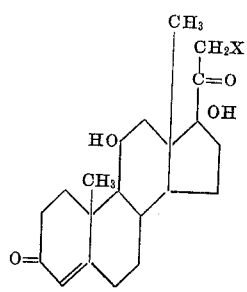

wherein X is either a hydrogen or a halogen atom.

The compounds which constitute this invention are prepared most conveniently from 11,17,21-trihydroxy-4-pregnene-3,20-dione. This compound is treated with a large excess of benzenesulfonyl chloride, preferably 10 to 30 moles, and one mole of pyridine or a lower alkylated pyridine derivative such as 2,4,6-collidine, to produce the 21-benzenesulfonate. It has been found that practically quantitative yields are obtained in this esterification at temperatures of about 40° C., while lower temperatures result in much poorer yields. It has further been found that use of toluenesulfonyl chloride and a large excess of the pyridine derivative gives unsatisfactory results.

If the above esterification reaction is permitted to proceed further, especially in the presence of an excess of benzenesulfonyl chloride, there occurs hydrolysis of the ester linkage with formation of the 21-chloro compound

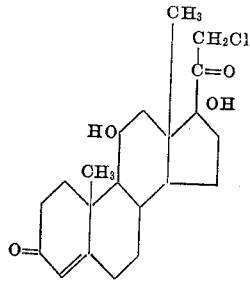

The 21-bromo-11,17-dihydroxy-4-pregnene-3,20-dione is produced by using benzenesulfonyl bromide instead of benzenesulfonyl chloride. The 21-iodo derivative is produced from the benzenesulfonate or the 21-chloro derivative by treatment with an alkali iodide, such as sodium iodide, in an organic solvent, such as a lower alkanone. This 21-iodo substituent can be removed by treatment with a mild metallic reducing agent such as zinc and acid.

The compounds which constitute this invention are valuable medicinal agents. Thus the 11,17-dihydroxy-4-pregnene-3,20-dione shows valuble adrenocorticoid and anti-arthritic activity. The halogen compounds are useful for adrenal visualization and antihormonal action.

The following experimental part illustrates in detail some of the compounds which constitute this invention and methods for their production. However, this invention is not to be construed as limited thereby in spirit or in scope since it will be apparent to organic chemists that many modifications in materials and methods may be made without departing from the invention. In these examples temperatures are given in degrees centigrade (° C.) and relative amounts of materials in parts by weight. Melting points were determined on a calibrated Fisher-Johns block.

Example 1

A mixture of 100 parts of 11β,17α,21-trihydroxy-4-pregnene-3,20-dione, 32 parts of 2,4,6-collidine and 1380 parts of benzenesulfonyl chloride is stirred with a stream of nitrogen bubbles and maintained at a temperature of 40° C. After 23 hours the reaction mixture is passed through a silica gel column and the benzenesulfonyl chloride is eluted with 80 parts of a 19:1 mixture of benzene and ethyl acetate. Elution of the column with 3:1, 2:1 and 1:1 mixtures of benzene and ethyl acetate yields a mixture of the 21-sulfonate of 11β,17α,21-trihydroxy-4-pregnene-3,20-dione and 21-chloro-11β,17α-dihydroxy-4-pregnene-3,20-dione. Repeated recrystallizations from acetone yield a product melting at about 232–237° C., consisting primarily of

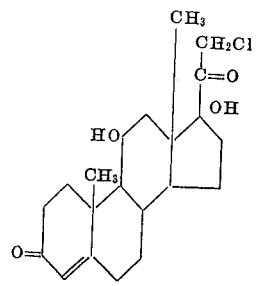

Example 2

A solution of 212 parts of this product in 5000 parts of acetone is treated with a solution of 220 parts of sodium iodide in 5000 parts of acetone. The reaction mixture is kept at room temperature for 2 hours and then heated at 52° C. to evaporate the acetone, the iodide remaining as a thick sludge. The 21-iodo-11β,17α-dihydroxy-4-pregnene-3,20-dione is crystallized from acetone in the form of relatively unstable, shining prisms. It has the structural formula

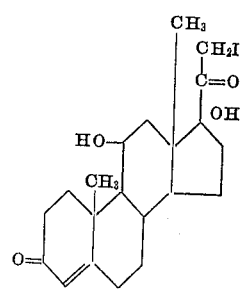

Example 3

The crude sludge of the 21-iodo-11β,17α-dihydroxy-4-pregnene-3,20-dione, produced as in Example 2, is dissolved in 2000 parts of glacial acetic acid and maintained at room temperature for 45 minutes. The liberated iodide is reduced with 100 parts of zinc dust and the mixture is poured into water. The resulting aqueous suspension is extracted with methylene chloride and this extract is washed with 10% sodium bicarbonate solution and with saturated sodium chloride solution. It is then filtered through anhydrous sodium sulfate and evaporated to dryness in vacuo. Recrystallized from acetone, the crude 11β,17α-dihydroxy-4-pregnene-3,20-dione melts at about 195–199.5° C. It has the structural formula

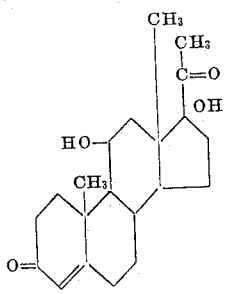

*Example 4*

147 parts of the product of Example 3 are dissolved in 3600 parts of ethyl acetate and the solution is diluted with 10,000 parts of benzene and put onto a silica gel column. Elution with benzene and ethyl acetate, evaporation of the eluate, and crystallization of the residue from ethyl acetate yields 11β,17α-dihydroxy-4-pregnene-3,20-dione, melting at about 203–205° C. A persistent yellow contaminant follows through several crystallizations and is not completely removed by chromatography. It is removed, however, by boiling an acetone solution with charcoal, whereby white to cream colored needles are obtained. The pure product shows a green fluorescence when treated with concentrated sulfuric acid.

I claim:
11β,17α-dihydroxy-4-pregnene-3,20-dione.

References Cited in the file of this patent
UNITED STATES PATENTS
2,602,769    Murray et al. _____ July 8, 1952